United States Patent

[11] 3,597,852

| [72] | Inventor | John K. McCollough, Jr.<br>Spartanburg, S.C. |
|---|---|---|
| [21] | Appl. No. | 5,388 |
| [22] | Filed | Jan. 2, 1970 |
| [45] | Patented | Aug. 10, 1971 |
| [73] | Assignee | Deering Milliken Research Corporation<br>Spartanburg, S.C.<br>Continuation of application Ser. No.<br>675,565, Oct. 16, 1967, now abandoned. |

[54] COIN CONVEYOR AND SHRINK OVEN
3 Claims, 2 Drawing Figs.

[52] U.S. Cl. ............................................. 34/218,
34/236, 53/212, 198/183
[51] Int. Cl. ............................................. B65b 11/04
[50] Field of Search ............................................. 34/218,
236; 198/183; 53/30, 184, 212

[56] References Cited
UNITED STATES PATENTS

| 1,595,829 | 8/1926 | Furbush | 34/218 |
| 2,696,978 | 12/1954 | Siegel | 198/183 X |
| 2,991,687 | 7/1961 | Henebry | 198/183 X |
| 3,011,620 | 12/1961 | Amori | 198/183 X |
| 3,340,882 | 9/1967 | Holmes et al. | 53/212 X |
| 3,378,989 | 4/1968 | Denker | 53/184 |

Primary Examiner—Frederick L. Matteson
Assistant Examiner—Harry B. Ramey
Attorneys—Norman C. Armitage and H. William Petry ABSTRACT: This application discloses a method and apparatus to efficiently convey and shrink a pillow package around a roll of coins in a shrink oven. Basically a plurality of rollers are rotatably connected to an endless chain and the roll of coins is dropped into the conveyor between a pair of rollers and is constantly rotated by the rollers to orient the coins and allow even shrinkage of the film on all sides of the package.

Patented Aug. 10, 1971
3,597,852
2 Sheets-Sheet 1
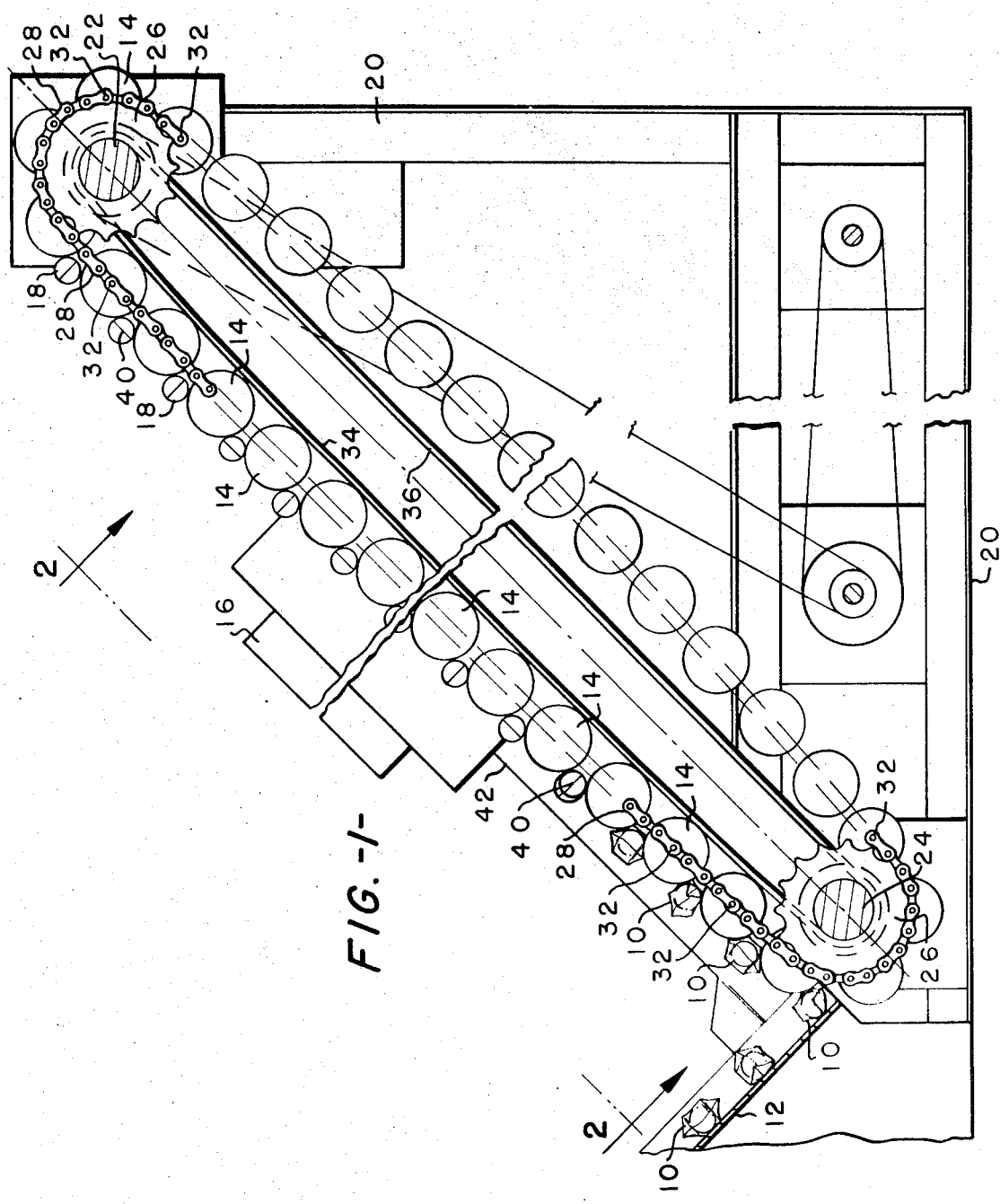
INVENTOR.
JOHN K. McCOLLOUGH, JR.
Earle R. Marden
ATTORNEY

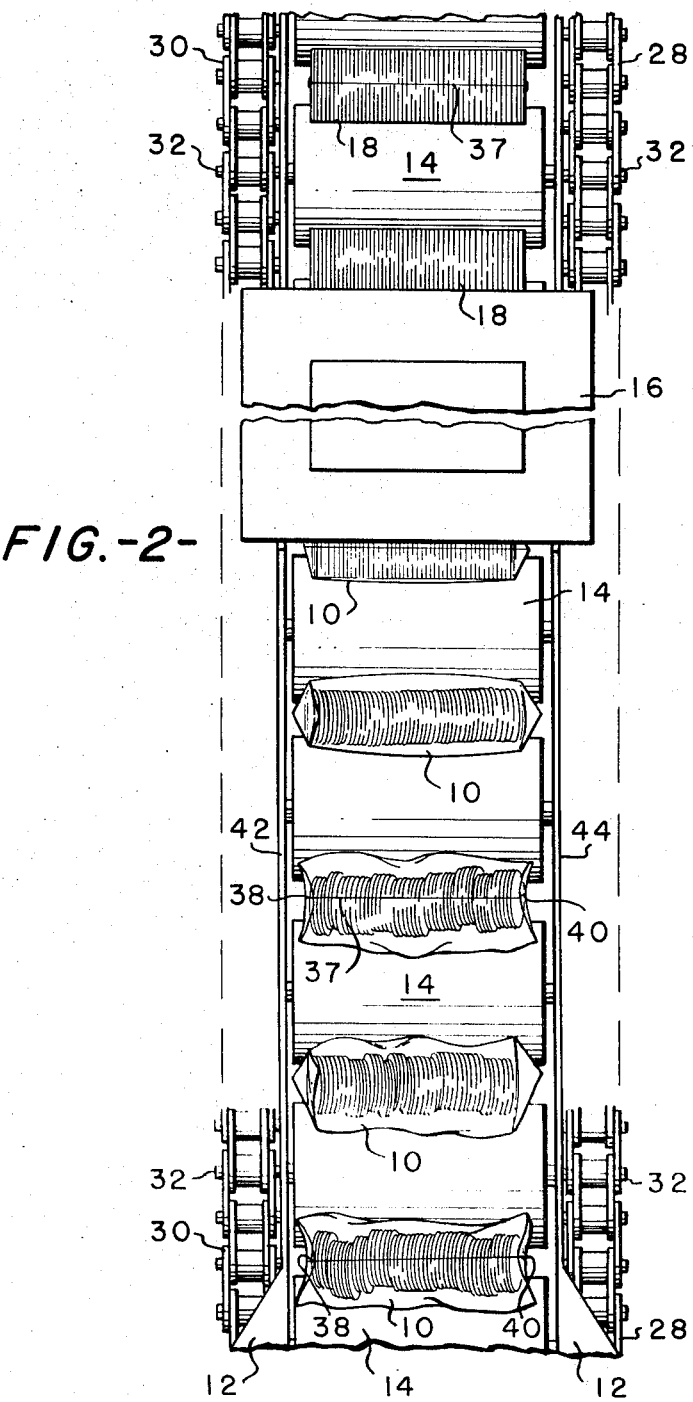
FIG.-2-

COIN CONVEYOR AND SHRINK OVEN

This application is a continuation of application Ser. No. 675,565, filed Oct. 16, 1967, now abandoned.

This invention relates generally the packaging of a plurality of cylindrical objects and more particularly to methods and apparatus to convey and heat shrink a package around a roll of coins.

On conventional heat shrink machinery it is often difficult to obtain a uniform shrinkage of the film around the object or objects to be packaged. The problem is further compounded when it is desired to package a plurality of substantially identically shaped objects in the same package and obtain a neat compact package. This is especially true when it is desired to heat shrink a film material around a predetermined number of coins of the same denomination to provide a neat and efficient roll of coins.

It is therefore an object of the invention to provide a novel apparatus and method to provide a neat compact roll of coins packaged in a heat shrunk film.

A further object of the invention is to provide a novel conveying system for rolls of coins wrapped in shrink film which acts on the coins to insure even shrinkage of the film around the coins.

Other objects and advantages of my invention will become apparent as the specification proceeds to describe the invention with reference to the accompanying drawings in which:

FIG. 1 is a partially schematic side elevation of the conveying apparatus of the invention; and FIG. 2 is a partial top view taken on line 2-2 of FIG. 1.

Looking now to the drawings and especially FIG. 1 the overall operation is shown in that rolls of coins 10 wrapped in shrink film, in the manner disclosed in my copending application Ser. No. 643,257, are delivered from a wrapping machine, not shown, via a chute 12 to an endless conveyor. The rolls 10 are conveyed between the conveyor rollers 14 to a shrink oven 16 wherein the shrink film is evenly shrunk around the coins to provide the compact coin package 18 which is delivered by the conveyor to a chute, not shown, which in turn delivers the coin package 18 to an apparatus to automatically box or bag a predetermined number of completed rolls.

The conveying surface of the conveyor is supported at an angle to the horizontal of about 45° by the frame work 20 in which upper sprocket shaft 22 and lower sprocket shaft 24 are rotatably mounted. Rigidly secured to the sprocket shafts and rotating therewith are sprocket shaft 22 and lower sprocket shaft 24 are rotatably mounted. Rigidly secures to the sprocket shafts and rotating therewith are sprockets 26 which support on both sides of the conveyor endless chains 28 and 30. Supported between the endless chains 28 and 30 are rollers 14 which are free to rotate relative to the chains 28 and 30. In the preferred form of the invention a pin 32 projects through each of the chains into an opening in the ends of the rollers 14 to freely support the rollers 14 between the chains. If desired, bearings can be used internally of the rollers but such are not considered necessary. Located within the frame 20 is a guide platform having upper and lower runs 34 and 36, respectively. It should be noted that the upper platform is slightly convex to insure contact of the rolls 14 thereto to provide positive drive to rotate the rollers 14 as the chains 28 and 30 travel up the conveyor.

The rolls 14 are preferably made of nylon but other suitable material can be employed. The centerline of adjacent rolls 14 is so selected in conjunction with the diameter of the rolls to provide intimate contact with coin package 10 so that as the rollers 14 rotate due to contact with the upper run 34 of the platform the coin packages will be constantly rotated as they pass up the conveyor through the shrink oven 16. Shrink oven 16 can be of any conventional style and be elevated to any temperature which will efficiently shrink the film. In the preferred form of the invention the shrink oven operates on hot air at a temperature in the range of 275° F. to 700° F. depending on the speed of the conveyor and the particular film employed.

OPERATION

As discussed previously, the coin packages 10 are preferably of the type disclosed in copending application Ser. No. 643,257 in that a predetermined number of coins are sealed in a pillow type package of heat-shrinkable film. This type of package has a longitudinal seal 37 which extends between transverse seams 38 and 40 which are substantially parallel to each other. The coin packages 10 slide down a chute 12 into position between a pair of rollers 14 at the bottom of the conveyor with the longitudinal axis of the rollers. To center the packages in the middle of the rolls 14 a pair of guide plates 42 and 44 are mounted in a vertical position to the frame 20 to confine the packages 10 between the ends of the rollers 14 as they drop from the chute 12. The guide plates 42 and 44 extend from the entrance of the conveyor up to the entrance to the shrink oven 16.

As discussed briefly before, the rollers 14 are rotating continuously in the clockwise direction thereby causing the coin packages 10 to rotate continuously in the counterclockwise direction as they travel up the conveyor. As in conventional shrink oven systems heat from the oven 16 escapes into the surrounding atmosphere and tends to start to shrink the film around the coins as they initially dropped between the rollers 14. Therefore, it is necessary to constantly turn the coin package to prevent differential shrinkage. Therefore, looking at FIG. 2, it can be seen that the continuous rotation of the coin package not only provides for even shrinkage of the film around the coins but also aligns the coins in both the vertical and horizontal directions. This alignment is necessary to provide a compact, neat looking coin package as indicated at 18. Looking at the lower coin package 10 in FIG. 2 it can be seen that the coins are misaligned not only along the horizontal axis of the rollers but also misaligned in the vertical direction. It can readily be seen that by constant rotation that the coins in the package which are higher than the other coins will be forced into alignment as well as the coins which are misaligned in the horizontal direction.

The coin packages 10, while being constantly rotated, pass through the shrink oven 16 wherein complete shrinkage of the film in the coins is accomplished. Then the coin packages pass out of the oven 16 as completed packages 18 where the constant rotation of the package 18 provides even cooling of the package. From the top of the conveyor the completed coin package is delivered to apparatus to box or bag a plurality of such packages for shipment to the user.

The herein disclosed method and apparatus provides a neat, compact coin package which utilizes shrink film to form such package. The apparatus is simple in construction, reliable in operation and provides the two basic functions of aligning the coins within the film package and providing even shrinkage of the film around the coins.

While the apparatus disclosed and described herein constitutes the preferred form of the invention, it will be understood that the apparatus may be capable of alteration without departing from the spirit of the invention and that all modifications that fall within the scope of the appended claims are intended to be included herein.

That which I claim is:

1. Apparatus to heat shrink a film of heat shrinkable film around a roll of coins comprising: a conveyor, said conveyor having a guide platform with a convex upper surface, said conveyor including a plurality of freely supported rollers in contact with said convex surface, means supporting adjacent rollers from one another a distance substantially greater than the diameter of said rolls of coins to provide a space between adjacent rollers a shrink oven operably associated with said conveyor, means to supply film wrapped coin rolls into the spaces between adjacent rollers and means to interconnect said rollers into an endless belt and means to drive said endless belt of rollers to transport coins from the supply means to said shrink oven and cause said rollers to be rotated by said convex surface to rotate rolls of coins in said space between adjacent rollers to evenly shrink the film therearound.

2. The structure of claim 1 wherein said roller interconnecting means is a pair of endless chains.

3. The structure of claim 1 wherein guide means are provided to guide a coin roll centrally over the space between two adjacent rollers.